(12) United States Patent
Laufenberg et al.

(10) Patent No.: US 7,930,898 B2
(45) Date of Patent: Apr. 26, 2011

(54) A/C DRAIN LINE DEVICE

(76) Inventors: Bryce Laufenberg, Tamarac, FL (US); Gary H Laufenberg, Cooper City, FL (US)

( * ) Notice: Subject to any disclaimer, the term of this patent is extended or adjusted under 35 U.S.C. 154(b) by 408 days.

(21) Appl. No.: 12/152,049

(22) Filed: May 12, 2008

(65) Prior Publication Data

US 2009/0277206 A1    Nov. 12, 2009

(51) Int. Cl.
*F25D 21/14*        (2006.01)
(52) U.S. Cl. .................................... 62/285; 62/291
(58) Field of Classification Search ............... 62/285, 62/288, 289, 290, 291; 137/238, 861
See application file for complete search history.

(56) References Cited

U.S. PATENT DOCUMENTS

| | | | |
|---|---|---|---|
| 6,584,995 B2 | 7/2003 | Kimbrough et al. | |
| 6,708,717 B1 | 3/2004 | Coogle | |
| 6,988,874 B2 * | 1/2006 | Spargo | 417/234 |
| 7,033,108 B1 * | 4/2006 | Hummert et al. | 405/37 |
| 2003/0084676 A1 * | 5/2003 | Thurman | 62/256 |
| 2004/0011090 A1 * | 1/2004 | Crowell et al. | 68/208 |
| 2007/0098582 A1 * | 5/2007 | Schulman | 417/559 |

* cited by examiner

*Primary Examiner* — Mohammad Ali
(74) *Attorney, Agent, or Firm* — Ruben Alcoba, Esq

(57) ABSTRACT

An air conditioning drain device essentially comprising a tubular pipe assembly, a flapper assembly, and a service port assembly. The device automatically engages a flapper valve that prevents the reverse flow of condensate water from entering a dwelling unit that shares a common drain line with multiple units, while at the same time allowing for quick and easy flushing of blockages in the drain line without causing water damage to the interior of the dwelling unit.

4 Claims, 2 Drawing Sheets

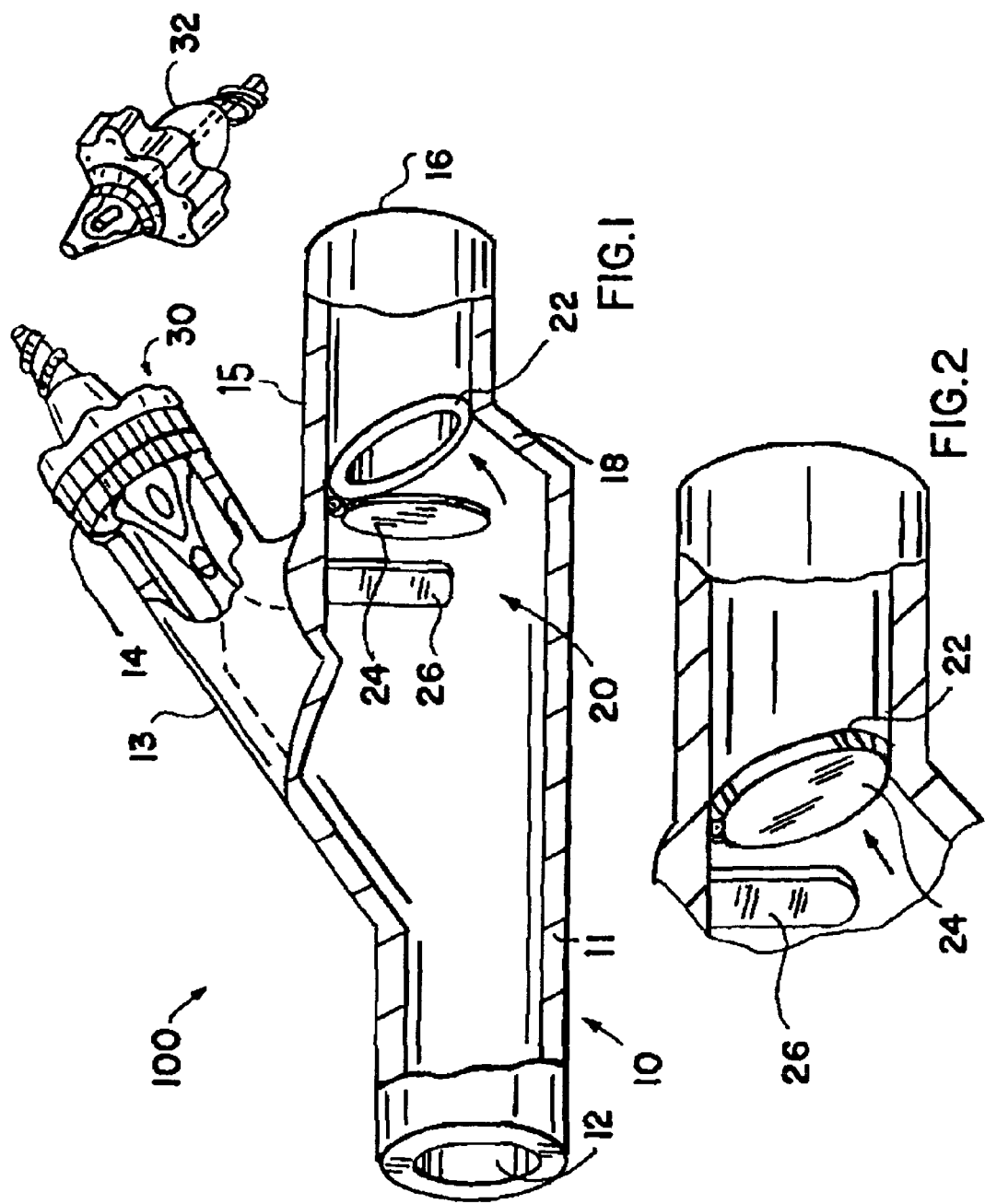

A/C DRAIN LINE DEVICE

BACKGROUND

The present invention is an air conditioner drain line device that automatically engages a flapper that prevents the reverse flow of condensate water from entering a dwelling unit that shares a common drain line with multiple units, while at the same time allowing for quick and easy flushing of blockages in the drain line without causing water damage to the interior of the dwelling unit.

The inventor has been an air conditioning service technician for nine (9) years and has witnessed the flooding of dwelling units caused by blockages in the condensate drain line of multi-unit complexes that share a common drain line. The bottom unit of a multi-unit complex sharing a community drain line is particularly vulnerable to water damage caused from the reverse flow of condensate water when the trap at the bottom of the community drain line becomes blocked. After witnessing several units damaged by the back flow of water into the units because of a blockage in the community drain line and after hearing the frustrated cries of unit owners exclaim "there must be something that can be done about this" the inventor conceived the present invention.

Under normal conditions, a well maintained air conditioning unit produces a steady trickle of condensate water from the cooling coils of the unit. This flow is commonly referred to in the industry as the "two year old trickle" as the flow is similar to that which one can expect from a two year old urinating. Under normal conditions the trickle drains from the air conditioning unit, through the condensate drain line and exits the dwelling unit.

The condensate water often collects dust or other airborne debris that passes through the air conditioning unit and this combined with the microbial and bacterial growths that thrive in moist pipes often result in blockages in the drain lines. When the drain lines are blocked, water cannot drain properly and the only place the fluid produced from the air conditioning units can go is either up the community drain line or back into the dwelling unit. In order to remove the blockage in the drain line, the dwelling owner is required to call a service technician who must dismantle a portion of the air conditioning unit in order to remove the blockage.

In order to address this problem the inventor invented the present invention. The present invention comprises essentially a tubular pipe assembly with a plurality of openings forming an opening to let water in, an opening to let water out, an opening that can be used as a service port and a flapper assembly positioned between two of the openings thereby creating a valve that will only allow water to flow in one direction.

After the present invention is installed, a blockage in the community drain line would not result in damage to the unit which has the invention. Specifically, in the event that the trap in the community drain line was to clog and water was to back up the drain line, the flapper would engage and form a seal that would prevent any water from entering the dwelling unit. Moreover, if all the units who share a community drain line install the present invention, a blockage in drain line would cause water to back up and rise up the community drain line several stories high so that eventually the pressure of the water backed up in the community drain line would disengage the blockage with out having to call a service technician.

The service port in the present invention allows for easy access to a unidirectional pressure valve that can receive a pressurized gas or liquid that can be used to dislodge a blockage in the drain line. By positioning the service port in between the flapper assembly and the first opening of the tubular pipe assembly, when a pressurized gas or liquid is released through the service port, the flapper would engage and force the pressurized gas or liquid out the first opening of the tubular pipe assembly, down the community drain line and dislodge the blockage of the drain line.

An objective of the present invention is to provide a device that will prevent the backflow of condensate water into a dwelling unit and the associated property damage that would occur in the event of a blockage in the condensate drain line.

Another objective of the present invention is to provide a device that can automatically engage a self flushing mechanism in the event condensate water backs up several stories up a community drain line of a multi-unit complex where multiple units share a community drain line.

Another objective of the present invention is to provide a device with an easy to access service port.

Yet a further objective of the present invention is to provide a device that would allow a service technician to disengage a blockage in the community drain line without having to cut any drainage pipes.

Information relevant to attempts to address these problems can be found in U.S. Pat. Nos. 6,584,995 (hereinafter the "995 patent") and 6,708,717 (hereinafter the "717 patent". However, each one of these reference suffers from one or more of the following disadvantages. The 995 patent is only meant to prevent the back flow of air and therefore the flapper device would not prevent the back flow of condensate water. Specifically, the 995 patent does not include a flapper stopper and therefore the flapper may become stuck in the open position thereby failing to close and block the back flow of condensate water. The 995 patent also includes a protrusion connected to the interior surface of its tubular member that would prevent the trickle of the condensate water from exiting the drain line. The 717 patent does not disclose a valve assembly that can be automatically engaged upon the reverse flow of condensate water thereby requiring the manually engagement of the valve which defeats the preventative features of the present invention.

For the foregoing reasons there exists a need for an air conditioning drain device that automatically engages a flapper that prevents the reverse flow of condensate water from entering a dwelling unit that shares a common drain line with multiple units, while at the same time allowing for quick and easy flushing of blockages in the drain line without causing water damage to the interior of the dwelling unit.

SUMMARY

The present invention is an air conditioning drain device essentially comprising a tubular pipe assembly with a plurality of openings forming an opening to let water in, an opening to let water out and an opening that can be used as a service port as well as a flapper assembly that automatically engages a flapper that prevents the reverse flow of condensate water from entering a dwelling unit that shares a common drain line with multiple units, while at the same time allowing for quick and easy flushing of blockages in the drain line without causing water damage to the interior of the dwelling unit.

In the event the community drain line becomes clogged and water backs up the drain line, the flapper engages and forms a seal that prevents any water from entering the dwelling unit. The service port in the present invention allows for easy access to a unidirectional pressure valve that can receive a pressurized gas or liquid that can be used to dislodge a blockage in the drain line

DRAWINGS

These and other features, aspects, and advantages of the present invention will become better understood with regard to the following description, appended claims and drawings where:

FIG. 1 shows a partially broken away perspective view one embodiment of the present invention with the flapper in the open position;

FIG. 2 shows a partially broken away partial perspective view of one embodiment of the present invention with the flapper in the closed position;

DESCRIPTION

Figure 3:
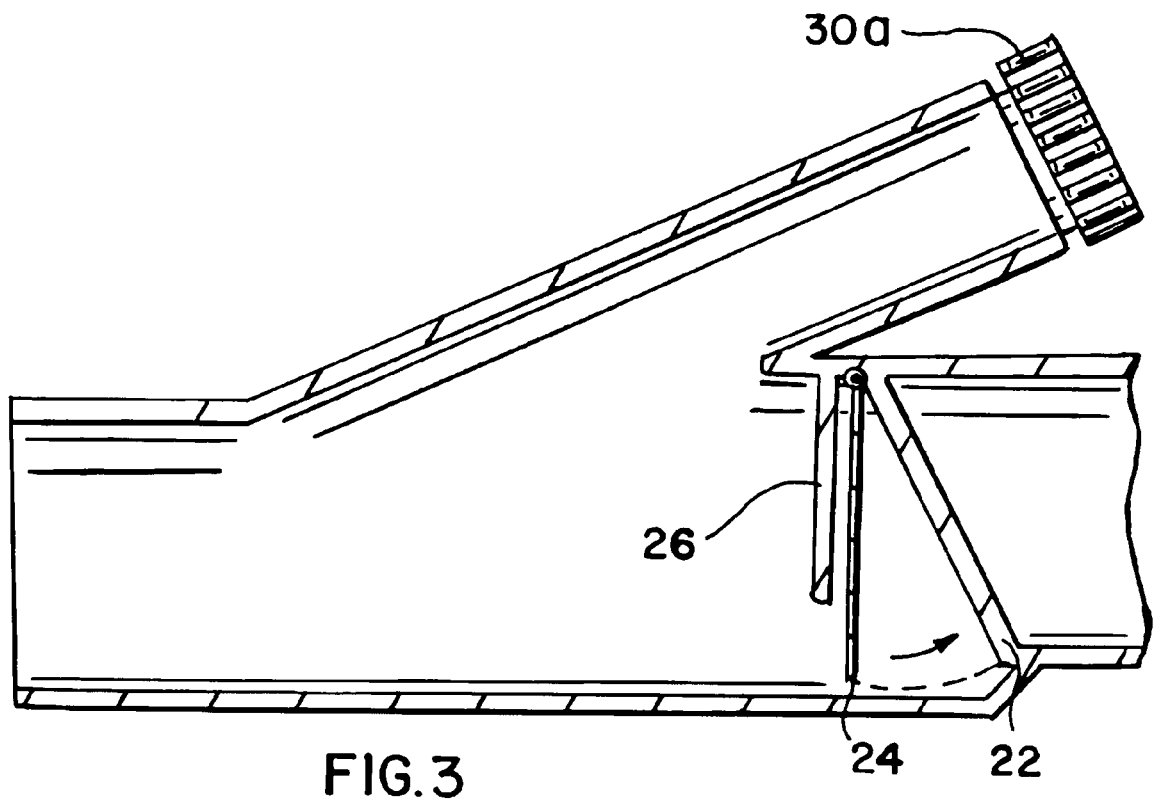
FIG. 3 shows a side elevation view of one embodiment of the present invention with the flapper in the open position.

As shown in FIG. 1, an air conditioner drain line device 100 comprising a Y shaped tubular pipe assembly 10, a flapper assembly 20, and a service port assembly 30.

The Y shaped tubular pipe assembly 10, has a first tubular member 11, having an upper side and a lower side and an interior surface and an exterior surface, a first opening 12; a second tubular member 13, having and upper side and a lower side and an interior surface and an exterior surface, a second opening 14; and a third tubular member 15, having and upper side and a lower side and an interior surface and an exterior surface, and a third opening 16.

The first tubular member 11 forms the base of the Y shaped tubular pipe assembly 10. The second tubular member 13 and the third tubular member 15 form the arms of the Y shaped tubular pipe assembly 10. First tubular member 11 is seamlessly joined to second tubular member 13 at a juncture point between first opening 12 and second opening 14; first tubular member 11 is seamlessly joined to third tubular member 15 at a juncture point between first opening 12 and third opening 16; and second tubular member 13 is seamlessly joined to third tubular member 15 at a juncture point between first opening 12 and third opening 16.

An internal ridge 18, having a top end and a lower end, is positioned along the interior surface of Y shaped tubular pipe assembly 10. Internal ridge 18 diagonally connects first tubular member 11 and third tubular member 15 such that third tubular member 15 is at a higher elevation than first tubular member 11. The Y shaped tubular pipe assembly 10 may be composed of materials known in the art with the characteristics and qualities of Poly Vinyl Chloride (PVC) piping.

The flapper assembly 20 further comprises an internal lip 22 fixedly attached to the internal surface of third tubular member 15, whereby the internal lip 22 is diagonally positioned connecting the top end of the internal ridge 18 with a point along the interior surface of third tubular member 15 such that the internal lip 22 and the lower side of third tubular member 15 forms an obtuse angle. A flapper 24 is hingedly connected to the interior surface of the upper side of third tubular member 15 in between the juncture point of second tubular member 13 and third tubular member 15 and the third opening 16 of the Y shaped tubular pipe assembly 10. Flapper stop 26 is fixedly attached to the interior surface of the upper side of third tubular member 15 in between internal lip 22 and the juncture point of second tubular member 13 and third tubular member 15.

The service port assembly 30, further comprises a plurality of unidirectional pressure valves 32 that are removably connected to the second opening 14 of the Y shaped tubular pipe assembly 10.

The flapper stopper 26 might be positioned such that flapper 24 cannot pivot a full 180 degrees when fluid flows through third tubular member 15 towards first opening 12.

The air conditioner drain line device 100 can be installed by connecting third opening 16 to the condensate drain line (not shown) of an existing air conditioning unit (not shown) and connecting first opening 12 to an existing drain line (not shown) that connects to a main community drain line (not shown).

In normal operation, condensate water, trickles from the coils (not shown) of the existing air conditioning unit (not shown) through the condensate drain line (not shown), through third tubular member 15, over internal lip 22, down internal ridge 18, through first tubular member 11 and exits the air conditioner drain line device 100 through first opening 12 continuing to a main community drain line (not shown). If the condensate water flow is heavy enough to cause flapper 24 to pivot, the pivoting of flapper 24 would be limited by flapper stop 26.

However, in the event a blockage occurs in the main community drain line (not shown), condensate water would then flow from the main community drain line (not shown), enter the air conditioner drain line device (100) through first opening 12, continue through first tubular member 11 and engage flapper 24. Once engaged, flapper 24 would form a seal with internal lip 22, as seen in FIG. 2 thereby preventing the backflow of condensate water through third tubular member 15 and into the dwelling unit (not shown).

To dislodge a blockage in the main community drain line (not shown), a user connects a pressurized gas or liquid to the service port assembly 30 using the plurality of unidirectional pressure valves 32. The pressurized gas or liquid flows from the service port 30 through second tubular member 13, engaging the flapper 24 with the internal lip 22, creating a seal preventing pressurized gas or liquid from flowing through third tubular member 15 thereby causing the pressurized gas or liquid to flow through first tubular member 11, out first opening 12 and to the main community drain line (not pictured) to dislodge any blockage therein.

Figure 4:
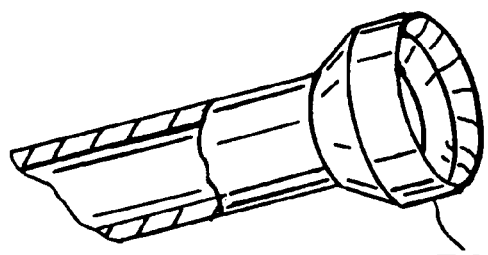
FIG. 4 shows an alternative embodiment of the service port assembly.

As seen in FIG. 3 and FIG. 4, the service port assembly may have several embodiments, including a service port cap 30a and an alternative means for receiving the pressurized gas or liquid 30b.

An advantage of the present invention is that it provides a device that will prevent the backflow of condensate water into a dwelling unit and the associated property damage that would occur in the event of a blockage in the condensate drain line.

Another advantage of the present invention is that it provides a device that can provide for a self flushing mechanism in the event condensate water backs up several stories up a community drain line of a multiunit complex where multiple units share a community drain line.

Another advantage of the present invention is that it provides a device with an easy to access service port.

Yet still another advantage of the present invention is that it provides a device that allows a service technician to disengage a blockage in the community drain line without having to cut any drainage pipes.

Although the present invention has been described in considerable detail with reference to certain preferred versions thereof, other versions are possible. Therefore, the spirit and the scope of the claims should not be limited to the description of the preferred versions contained herein.

What is claimed is:

1. An air conditioner drain line device comprising:
   a tubular pipe assembly comprising a plurality of tubular members, having an opening, an upper side, a lower side, an interior surface, and an exterior surface, seamlessly and communicably attached to each other;
   a flapper assembly disposed along the interior surface of one of the tubular members of the tubular pipe assembly, the flapper assembly comprises:
   an internal lip spanning a portion of the interior surface of the third tubular member of the tubular pipe assembly, whereby the internal lip is positioned between the opening of the second tubular member and the opening of the third tubular member of the tubular pipe assembly;
   a flapper hingedly connected to the interior surface of the tubular pipe assembly whereby the flapper is positioned between the internal lip of the tubular pipe assembly and the opening of the second tubular member of the tubular pipe assembly; and
   a flapper stop fixedly attached to the interior surface of the tubular pipe assembly whereby the flapper stop is positioned between the flapper and the opening of the second tubular member of tubular pipe assembly, and wherein the flapper is pivotable between an open and a closed position and wherein the flapper, when in the closed position, engages with the interior lip so that a seal is formed;
   a service port assembly removably attached to the opening of one of the tubular members of the tubular pipe assembly; and
   an internal ridge connecting the first tubular member to the third tubular member whereby the internal ridge is disposed along the internal surface of the first tubular member and the third tubular member in between the internal lip of the flapper assembly and the flapper stop of the flapper assembly, such that the first tubular member is at a lower elevation than the third tubular member.

2. An air conditioner drain line device comprising:
   a tubular pipe assembly comprising a plurality of tubular members, having an opening, an upper side, a lower side, an interior surface, and an exterior surface, seamlessly and communicably attached to each other, and wherein the tubular pipe assembly further comprises a first tubular member, a second tubular member, and a third tubular member, each having an opening, an upper side, a lower side, an interior surface and an exterior surface, wherein the first tubular member is seamlessly and communicably attached to the second tubular member at a juncture point between the opening of the first tubular member and the opening of the second tubular member;
   a flapper assembly disposed along the interior surface of one of the tubular members of the tubular pipe assembly; and
   a service port assembly removably attached to the opening of one of the tubular members of the tubular pipe assembly, the service port assembly is removably attached to the opening of the second tubular member of the tubular pipe assembly.

3. The device of claim 2, wherein the service port assembly further comprises a plurality of removably attachable unidirectional pressure valves.

4. The device of claim 3, wherein the unidirectional pressure valves is are adapted to receive a line of pressurized gas or liquid.

\* \* \* \* \*